(12) United States Patent
Hengst et al.

(10) Patent No.: US 11,161,100 B2
(45) Date of Patent: Nov. 2, 2021

(54) USE OF A PALLADIUM/PLATINUM/ZEOLITE-BASED CATALYST AS PASSIVE NITROGEN OXIDE ADSORBER FOR PURIFYING EXHAUST GAS

(71) Applicant: UMICORE AG & CO. KG, Hanau-Wolfgang (DE)

(72) Inventors: Christoph Hengst, Butzbach (DE); Michael Lennartz, Frankfurt (DE); Frank-Walter Schuetze, Aschaffenburg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/641,876

(22) PCT Filed: Aug. 24, 2018

(86) PCT No.: PCT/EP2018/072869
§ 371 (c)(1),
(2) Date: Feb. 25, 2020

(87) PCT Pub. No.: WO2019/042884
PCT Pub. Date: Mar. 7, 2019

(65) Prior Publication Data
US 2020/0246784 A1    Aug. 6, 2020

(30) Foreign Application Priority Data
Aug. 31, 2017   (EP) .................................... 17188771

(51) Int. Cl.
| *B01J 29/74* | (2006.01) |
| *B01J 35/00* | (2006.01) |
| *B01J 37/02* | (2006.01) |
| *B01J 37/08* | (2006.01) |
| *B01D 53/94* | (2006.01) |

(52) U.S. Cl.
CPC .......... *B01J 29/743* (2013.01); *B01D 53/944* (2013.01); *B01D 53/9418* (2013.01); *B01D 53/9468* (2013.01); *B01J 29/74* (2013.01); *B01J 29/7415* (2013.01); *B01J 35/0006* (2013.01); *B01J 37/0205* (2013.01); *B01J 37/0228* (2013.01); *B01J 37/0236* (2013.01); *B01J 37/0242* (2013.01); *B01J 37/0244* (2013.01); *B01J 37/0246* (2013.01); *B01J 37/0248* (2013.01); *B01J 37/088* (2013.01); *B01D 2255/1021* (2013.01); *B01D 2255/1023* (2013.01); *B01D 2255/50* (2013.01); *B01J 2229/183* (2013.01); *B01J 2229/42* (2013.01)

(58) Field of Classification Search
CPC ............ B01D 53/9422; B01D 53/9459; B01D 2252/00; B01D 2252/602; B01D 2253/108; B01D 2255/102; B01D 2255/91; B01D 2257/402; B01D 2257/404; B01D 2258/012; F01N 3/0814; F01N 3/0842; F01N 3/103; F01N 2240/18; F01N 2250/12; F01N 2250/14
See application file for complete search history.

(56) References Cited

U.S. PATENT DOCUMENTS

| | | |
|---|---|---|
| 3,355,246 A | 11/1967 | Kuehl |
| 3,702,886 A | 11/1972 | Argauer et al. |
| 3,933,974 A | 1/1976 | Winquist |
| 4,000,248 A | 12/1976 | Martin |
| 4,076,842 A | 2/1978 | Plank et al. |
| 4,107,196 A | 8/1978 | Frye et al. |
| 4,139,600 A | 2/1979 | Rollmann et al. |
| 4,251,499 A | 2/1981 | Nanne et al. |
| 4,310,440 A | 1/1982 | Wilson et al. |
| 4,439,409 A | 3/1984 | Puppe et al. |
| 4,544,538 A | 10/1985 | Zones |
| 4,705,674 A | 1/1987 | Araya et al. |
| 4,657,750 A | 4/1987 | Takatsu et al. |
| 4,695,440 A | 9/1987 | Morimoto et al. |
| 4,826,667 A | 5/1989 | Zones et al. |
| 4,859,442 A | 8/1989 | Zones et al. |
| 5,314,674 A | 5/1994 | Francesco et al. |
| 5,958,370 A | 9/1999 | Zones et al. |
| 5,968,474 A | 10/1999 | Nakagawa et al. |
| 6,077,498 A | 6/2000 | Cabanas et al. |
| 6,709,644 B2 | 3/2004 | Zones et al. |
| 8,431,186 B2 | 4/2013 | Jeske et al. |
| 8,617,474 B2 | 12/2013 | Bull et al. |
| 9,657,626 B2 | 5/2017 | Theis et al. |
| 10,005,075 B2 | 6/2018 | Rajaram et al. |
| 10,179,329 B2 | 1/2019 | Phillips et al. |
| 10,428,708 B2 | 10/2019 | Utschig et al. |
| 10,525,412 B2 | 1/2020 | Chen et al. |
| 10,669,910 B2 * | 6/2020 | Chen .................. B01D 53/9418 |

(Continued)

FOREIGN PATENT DOCUMENTS

| BE | 1001038 A7 | 6/1989 |
| DE | 10 2008 010 388 A1 | 9/2009 |

(Continued)

OTHER PUBLICATIONS

International Search Report for PCT/EP2018/072869, dated Dec. 6, 2018 (14pgs. with English Translation).

(Continued)

*Primary Examiner* — Timothy C Vanoy
(74) *Attorney, Agent, or Firm* — Smith, Gambrell & Russell, LLP

(57) ABSTRACT

The invention relates to the use of a catalyst as a passive nitrogen oxide adsorber, which has a carrier substrate, a zeolite, palladium, and platinum, wherein the palladium is provided in a quantity of 0.01 to 10 wt. %, based on the sum of the weights of zeolite, platinum, and palladium and calculated as a palladium metal, and platinum in a quantity of 0.1 to 10 wt. %, based on the weight of the palladium and calculated as a platinum metal. The invention also relates to the use of said catalyst in connection with a SCR catalyst in an exhaust gas system.

23 Claims, 2 Drawing Sheets

(56) References Cited

U.S. PATENT DOCUMENTS

| | | |
|---|---|---|
| 2008/0141661 A1 | 6/2008 | Voss et al. |
| 2008/0159936 A1 | 7/2008 | Zones et al. |
| 2009/0320457 A1 | 12/2009 | Wan |
| 2014/0170062 A1 | 6/2014 | Moscoso |
| 2014/0322112 A1 | 10/2014 | Blakeman et al. |
| 2015/0118150 A1 | 4/2015 | Yang et al. |
| 2015/0157982 A1 | 6/2015 | Rajaram et al. |
| 2015/0158019 A1 | 6/2015 | Rajaram et al. |
| 2015/0217282 A1 | 8/2015 | Fedeyko et al. |
| 2015/0266002 A1* | 9/2015 | Biberger ............. B01J 35/0013 423/239.1 |
| 2016/0250594 A1* | 9/2016 | Casci ................. B01D 53/9481 423/239.1 |
| 2017/0001169 A1 | 1/2017 | Collier et al. |
| 2019/0217269 A1* | 7/2019 | Collier .................... B01J 29/54 |

FOREIGN PATENT DOCUMENTS

| | | |
|---|---|---|
| DE | 10 2014 118 092 A1 | 6/2015 |
| DE | 10 2014 118 096 A1 | 6/2015 |
| DE | 10 2015 113 415 A1 | 2/2016 |
| DE | 10 2015 119 913 A1 | 5/2016 |
| DE | 10 2016 112065 A1 | 1/2017 |
| DE | 11 2016 000 032 T5 | 3/2017 |
| EP | 0 040 016 A1 | 11/1981 |
| EP | 0 055 529 A1 | 7/1982 |
| EP | 0 103 981 A1 | 3/1984 |
| EP | 0 255 770 A2 | 2/1988 |
| EP | 0 288 293 A2 | 10/1988 |
| EP | 0 427 970 A2 | 5/1991 |
| EP | 0 885 650 A2 | 12/1998 |
| EP | 1 393 069 A1 | 3/2004 |
| EP | 1 420 149 A2 | 5/2004 |
| EP | 1 433 519 A1 | 6/2004 |
| EP | 1 820 561 A1 | 8/2007 |
| EP | 2 505 803 A2 | 10/2012 |
| EP | 3 009 400 A1 | 4/2016 |
| WO | 2008/047170 A1 | 4/2008 |
| WO | 2008/106519 A1 | 9/2008 |
| WO | 2008/118434 A1 | 10/2008 |
| WO | 2008/132452 A2 | 11/2008 |
| WO | 2012/029050 A1 | 3/2012 |
| WO | 2012/071421 A2 | 5/2012 |
| WO | 2012/156883 A1 | 11/2012 |
| WO | 2012/166868 A1 | 12/2012 |
| WO | 2014/184668 A1 | 11/2014 |
| WO | 2015/085303 A1 | 6/2015 |
| WO | 2016/020351 A1 | 2/2016 |
| WO | 2016/077667 A1 | 5/2016 |
| WO | 2017/075504 A1 | 5/2017 |

OTHER PUBLICATIONS

Written Opinion of the International Searching Authority for PCT/EP2018/072869, dated Dec. 6, 2018 (14pgs.).

Miyoshi, et al. SAE Technical Paper Series 950809, Development of New Concept Three-Way Catalyst for Automotive Lean-Burn Engines, Feb. 27-Mar. 2 (pp. 121-130), 1995.

Macmillan Journals Ltd. 1978, Synthesis and Structure of Synthetic Zeolite ZSM-11. Nature vol. 275, Sep. 14, 1978 (pp. 119-120).

Corma, et al. Zeolites 15, Synthesis and Characterization of the MCM-22 Zeolite. Issue 1, 1995 (pp. 2-8).

Lawton, et al. J. Chem. Soc., Chem. Commun., Synthesis and Proposed Framework Topology of Zeolite SUZ-4. 1993 (pp. 894-896).

Mayer. Dissertation, Feststoff-SCR-System auf Basis von Ammoniumcarbamat. 2005 (154 pages).

Baerlocher, et al., Atlas of Zeolite Framework Types, 5th revised edition, 2001, ISBN: 0-444-20701-9, pp. 1-303.

English Translation of the Written Opinion for International Patent Application No. PCT/EP2018/072869 dated Dec. 6, 2018 (6 Pages).

International Preliminary Report on Patentability for International Patent Application No. PCT/EP2018/072869 dated Mar. 3, 2020 (14 Pages German with translation).

Leiggener, C., et al. Zeolite A and ZK-4. Material Syntheses. 2008. Editors, Schubert, Hüsing, Laine. pp. 21-28.

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).

* cited by examiner

USE OF A PALLADIUM/PLATINUM/ZEOLITE-BASED CATALYST AS PASSIVE NITROGEN OXIDE ADSORBER FOR PURIFYING EXHAUST GAS

The present invention relates to the use of a zeolite coated with palladium and platinum as a passive nitrogen oxide adsorber for the passive storage of nitrogen oxides from the exhaust gas of a combustion engine.

The exhaust gas of motor vehicles that are operated with lean-burn combustion engines, such as diesel engines, also contains, in addition to carbon monoxide (CO) and nitrogen oxides ($NO_x$), components that result from the incomplete combustion of the fuel in the combustion chamber of the cylinder. In addition to residual hydrocarbons (HC), most of which are also gaseous, these include particulate emissions, which are also referred to as "diesel soot" or "soot particles." These are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

In order to clean such exhaust gases, the specified components must be converted as completely as possible into harmless compounds, which is only possible by using suitable catalysts.

Soot particles may be very effectively removed from the exhaust gas with the aid of particle filters. Wall-flow filters made of ceramic materials have proved particularly successful. These are made up of a multiple number of parallel channels formed by porous walls. The channels are closed alternately at one end of the filter such that first channels are formed that are open at the first end of the filter and closed at the second end of the filter, along with second channels that are closed at the first end of the filter and open at the second end of the filter. The exhaust gas flowing into the first channels, for example, may leave the filter again only via the second channels and must flow through the porous walls between the first and second channels for this purpose. The particles are retained when the exhaust gas passes through the wall.

It is known that particle filters can be provided with catalytically active coatings. For example, EP1820561 A1 describes the coating of a diesel particle filter with a catalyst layer that facilitates the combustion of the filtered soot particles.

A well-known process for removing nitrogen oxides from exhaust gases in the presence of oxygen is selective catalytic reduction using ammonia on a suitable catalyst (SCR process). With this process, the nitrogen oxides to be removed from the exhaust gas are converted into nitrogen and water using ammonia as a reducing agent.

As SCR catalysts, for example, iron-exchanged and particularly copper-exchanged zeolites can be used; see for example WO2008/106519 A1, WO2008/118434 A1 and WO2008/132452 A2. SCR catalysts for the conversion of nitrogen oxides with ammonia do not contain any precious metals, in particular no platinum and no palladium. In the presence of such metals, the oxidation of ammonia with oxygen into nitrogen oxides would be preferred, and the SCR reaction (conversion of ammonia with nitrogen oxide) would fall into second place. Where the literature sometimes speaks of platinum-exchanged or palladium-exchanged zeolites as "SCR catalysts," this does not refer to the $NH_3$ SCR reaction but to the reduction of nitrogen oxides by means of hydrocarbons. However, the latter conversion is not very selective and is therefore referred to as the "HC-DeNOx reaction" instead of the "SCR reaction."

The ammonia used as reducing agent can be made available by metering an ammonia precursor compound, such as urea, ammonium carbamate or ammonium formate, into the exhaust tract and subsequent hydrolysis.

SCR catalysts have the disadvantage that they only work above an exhaust gas temperature of approximately 180 to 200° C., and thus do not convert nitrogen oxides, which are formed in the cold-start phase of the engine.

So-called "nitrogen oxide storage catalysts," for which the term "lean NOx trap" or "LNT" is also commonly used, are also known for removing nitrogen oxides from the exhaust gas. Their cleaning effect is based on the fact that, in a lean operating phase of the engine, the nitrogen oxides are stored by the storage material of the storage catalysts predominantly in the form of nitrates, and such oxides are decomposed again in a subsequent rich operating phase of the engine, and the nitrogen oxides released in this manner are converted into nitrogen, carbon dioxide and water with the reducing exhaust gas components in the storage catalyst. This mode of operation is described, for example, in SAE 950809.

Storage materials that may be used include in particular oxides, carbonates or hydroxides of magnesium, calcium, strontium, barium, alkali metals, rare earth metals or mixtures thereof. Due to their basic properties, such compounds are able to form nitrates with the acidic nitrogen oxides of the exhaust gas and store them in this manner. They are deposited with the highest possible dispersion on suitable carrier materials in order to generate a large interaction surface with the exhaust gas. As a rule, nitrogen oxide storage catalysts also contain precious metals such as platinum, palladium and/or rhodium as catalytically active components. Their task is, on the one hand, to oxidize NO into $NO_2$, CO and HC into $CO_2$ and $H_2O$ under lean conditions, and, on the other hand, to reduce released $NO_2$ into nitrogen during the rich operating phases, in which the nitrogen oxide storage catalyst is regenerated. Modern nitrogen oxide storage catalysts are described, for example, in EP0885650 A2, US2009/320457, WO2012/029050 A1 and WO2016/020351 A1.

Combining particle filters and nitrogen oxide storage catalysts is already known. For example, EP1420 149 A2 and US2008/141661 describe systems comprising a diesel particle filter and a nitrogen oxide storage catalyst arranged downstream.

Moreover, it has already been proposed in, for example, EP1393069 A2, EP1433519 A1, EP2505803 A2, and US2014/322112, to coat particle filters with nitrogen oxide storage catalysts. US2014/322112 describes a zoning of the coating of the particle filter with nitrogen oxide storage catalyst in such a way that a zone starting from the upstream end of the particle filter is located in the input channels, and another zone starting from the downstream end of the particle filter is located in the output channels.

The mode of operation described in SAE 950809, in which nitrogen oxides are stored by a nitrogen oxide storage catalyst in a lean operating phase of the engine and released again in a subsequent rich operating phase, is also referred to as active nitrogen oxide storage. In addition, a method known as passive nitrogen oxide storage has also been described. Nitrogen oxides are here stored in a first temperature range and released again in a second temperature range, wherein the second temperature range is at higher temperatures than the first temperature range. Passive nitrogen oxide storage catalysts are used to implement this method, which catalysts are also referred to as PNAs (for "passive NOx adsorbers"). Passive nitrogen oxide storage catalysts can be used to store and release nitrogen oxides, particularly at temperatures below 200° C., at which an SCR catalyst has not yet reached its operating temperature, as soon as the SCR catalyst is ready for operation. Through the intermediate storage of the nitrogen oxides emitted by the engine below 200° C. and their concerted release above 200° C., an increased total nitrogen oxide conversion of the exhaust gas aftertreatment system can be realized.

Palladium supported on cerium oxide has been described as a passive nitrogen oxide storage catalyst; see for example WO2008/047170 A1 and WO2014/184568 A1, which can also be coated on a particle filter according to WO2012/071421 A2 and WO2012/156883 A1.

It is known from WO2012/166868 A1 that a zeolite containing palladium and another metal such as iron is used as a passive nitrogen oxide storage catalyst.

WO2015/085303 A1 discloses passive nitrogen oxide storage catalysts which contain a precious metal and a small-pore molecular sieve with a maximum ring size of eight tetrahedral atoms.

Modern and future diesel engines are becoming ever more efficient, which also lowers exhaust gas temperatures. At the same time, legislation regarding nitrogen oxide conversion is becoming increasingly stringent. This is resulting in SCR catalysts alone no longer being sufficient for compliance with the nitrogen oxide limits. In particular, there continues to be further need for technical solutions that ensure that nitrogen oxides formed during the engine's cold-start phase do not escape into the environment. In addition, technical solutions must ensure that stored nitrogen oxides are released (desorbed) as completely as possible in the operating window of a downstream SCR catalyst.

It has now been found that zeolites coated with palladium and platinum have excellent passive nitrogen oxide adsorption properties.

Accordingly, the present invention relates to the use of a catalyst comprising a carrier substrate of length L and a coating A comprising a zeolite, palladium and platinum, wherein palladium is present in amounts of 0.01 to 10 wt. %, based on the sum of the weights of zeolite, palladium and platinum, and is calculated as palladium metal, and platinum is present in amounts of 0.1 to 10 wt. %, based on the weight of palladium, and is calculated as platinum metal, as a passive nitrogen oxide adsorber that stores nitrogen oxides in a first temperature range and releases them again in a second temperature range, wherein the second temperature range is at higher temperatures than the first temperature range.

Zeolites are two or three-dimensional structures, the smallest structures of which can be considered to be $SiO_4$ and $AlO_4$ tetrahedra. These tetrahedra come together to form larger structures, wherein two are connected each time via a common oxygen atom. Rings of different sizes can be formed, for example rings of four, six or even nine tetrahedrally coordinated silicon or aluminum atoms. The different zeolite types are often defined by the largest ring size, because this size determines which guest molecules can and cannot penetrate the zeolite structure. It is customary to differentiate between large-pore zeolites with a maximum ring size of 12, medium-pore zeolites with a maximum ring size of 10, and small-pore zeolites with a maximum ring size of 8.

Zeolites are further divided into structure types by the Structural Commission of the International Zeolite Association, each of which is assigned a three-letter code; see for example Atlas of Zeolite Framework Types, Elsevier, 5th edition, 2001.

The use according to the invention includes a zeolite, which can be large-pored, medium-pored or small-pored.

Figure 1:
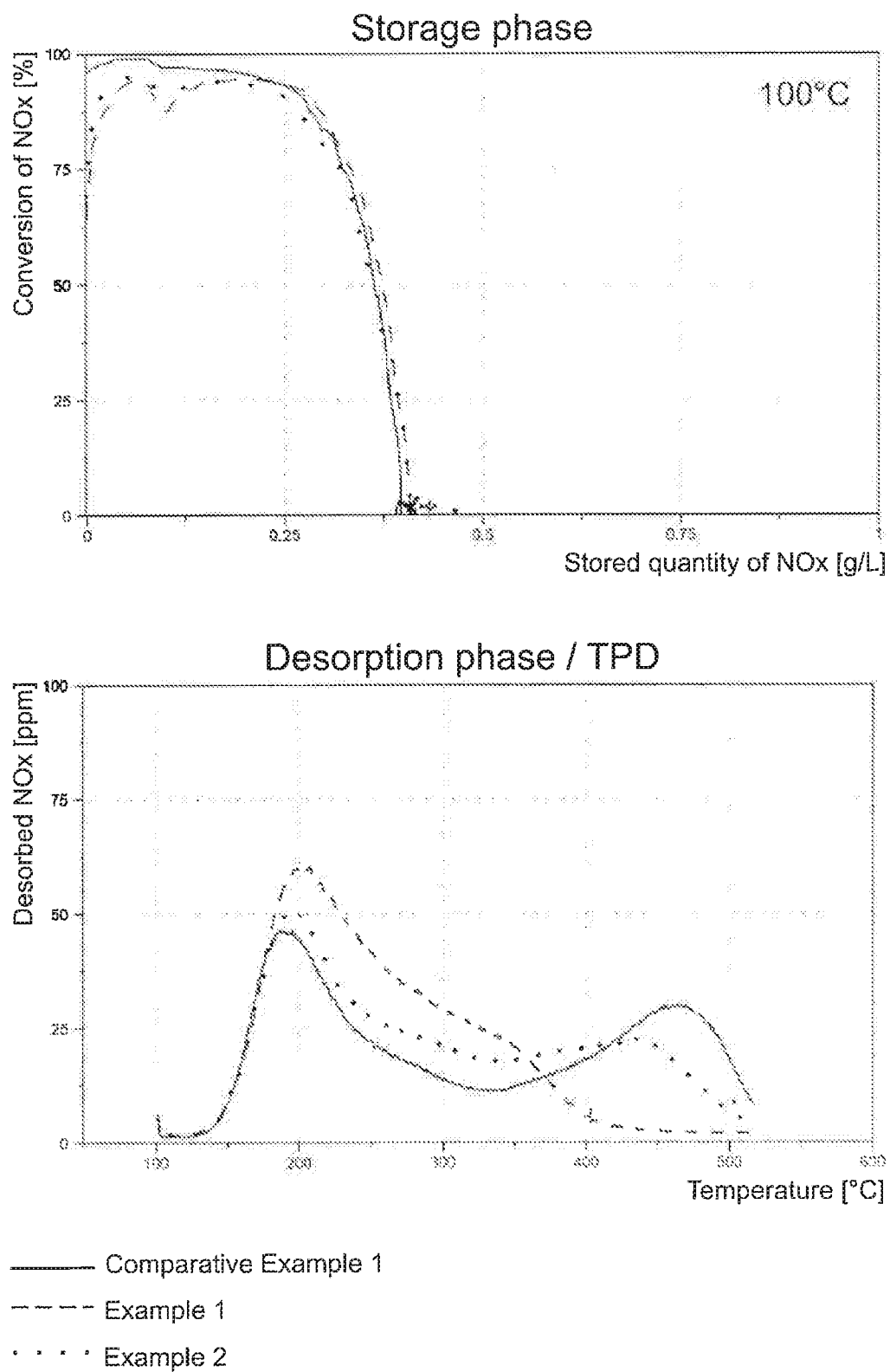
FIG. 1 shows NOx storage and desorption phase comparisons for Examples 1, 2 and Comparative Example 1.

In one embodiment, the use according to the invention comprises a zeolite, the largest channels of which are formed by 6 tetrahedrally coordinated atoms and which, for example, belongs to the structure types AFG, AST, DOH, FAR, FRA, GIU, LIO, LOS, MAR, MEP, MSO, MTN, NON, RUT, SGT, SOD, SVV, TOL or UOZ.

A zeolite of structure type AFG is afghanite. Zeolites of structure type AST are AlPO 16 and octadecasil. A zeolite of structure type DOH is docecasil 1H. A zeolite of structure type FAR is farneseite. A zeolite of structure type FRA is franzinite. A zeolite of structure type GIU is giuseppettite. A zeolite of structure type LIO is liottite. Zeolites of structure type LOS are losod and bystrite. A zeolite of structure type MAR is marinellite. A zeolite of structure type MEP is melanophlogite. Zeolites of structure type MSO are MCM-61 and Mu-13. Zeolites of structure type MTN are ZSM-39, CF-4, docecasil-3C and holdstite. Zeolites of structure type NON are nonasil, CF-3 and ZSM-51. Zeolites of structure type RUT are RUB-10 and Nu-1. A zeolite of structure type SGT is sigma-2. Zeolites of structure type SOD are sodalite, AlPO-20, bicchulite, danalite, G, genthelvite, hauyn, herivine, noselite, SIZ-9, TMA and tugtupite. A zeolite of structure type UOZ is IM-10.

The use according to the invention preferably comprises a zeolite, the largest channels of which are formed by 6 tetrahedrally coordinated atoms and which belongs to structure type SOD. Particularly suitable zeolites belonging to structure type SOD are well-known in the literature. For example, the synthesis of AlPO-20 is described in U.S. Pat. No. 4,310,440.

In another embodiment, the use according to the invention comprises a zeolite, the largest channels of which are formed by 8 tetrahedrally coordinated atoms and which has the structure types ABW, ACO, AEI, AEN, AFN, AFT, AFV, AFX, ANA, APC, APD, ATN, ATT, ATV, AVL, AWO, AWW, BCT, BIK, BRE, CAS, CDO, CHA, DDR, DFT, EAB, EDI, EEI, EPI, ERI, ESV, ETL, GIS, GOO, IFY, IHW, IRN, ITE, ITW, JBW, JNT, JOZ, JSN, JSW, KFI, LEV, -LIT, LTA, LTJ, LTN, MER, MON, MTF, MWF, NPT, NSI, OWE, PAU, PHI, RHO, RTH, RWR, SAS, SAT, SAV, SBN, SIV, THO, TSC, UEI, UFI, VNI, YUG or ZON.

A zeolite of structure type ABW is Li-A. A zeolite of structure type ACO is ACP-1. Zeolites of structure type AEI are SAPO-18, SIZ-8 and SSZ-39. Zeolites of structure type AEN are AlPO-53, IST-2, JDF-2, MCS-1, Mu-10 and UiO-12-500. A zeolite of structure type AFT is AlPO-52. Zeolites of structure type AFX are SAPO-56 and SSZ-16. Zeolites of structure type ANA are analcime, AlPO-24, leucite, Na—B, pollucite and wairakite. Zeolites of structure type APC are AlPO-C and AlPO-H3. Zeolites of structure type APD are AlPO-D and APO-CJ3. Zeolites of structure type ATN are MAPO-39 and SAPO-39. Zeolites of structure type ATT are AlPO-33 and RMA-3. A zeolite of structure type ATV is AlPO-25. A zeolite of structure type AWO is AlPO-21. A zeolite of structure type AWW is AlPO-22. Zeolites of structure type BCT are metavariscite and svyatoslavite. A zeolite of structure type BIK is bikitaite. Zeolites of structure type BRE are brewsterite and CIT-4. A zeolite of structure type CAS is EU-20b. Zeolites of structure type CDO are CDS-1, MCM-65 and UZM-25. Zeolites of structure type CHA are AlPO-34, chabazite, DAF-5, linde-D, linde-R, LZ-218, phi, SAPO-34, SAPO-47, SSZ-13, UiO-21, willhendersonite, ZK-14 and ZYT-6. Zeolites of structure type DDR are sigma-1 and ZSM-58. Zeolites of structure type DFT are DAF-2 and ACP-3. Zeolites of structure type EAB are TMA-E and belluphite. Zeolites of structure type EDI are edingtonite, K—F, linde F and zeolite N. Zeolites of structure type ERI are erionite, AlPO-17, linde T, LZ-220, SAPO-17 and ZSM-34. A zeolite of structure type ESV is ERS-7. Zeolites of structure type GIS are gismondine, amicite, garronite, gobbinsite, MAPO-43, Na-P1, Na-P2 and SAPO-43. A zeolite of structure type IHW is ITQ-3. Zeolites of structure type ITE are ITQ-3, Mu-14 and SSZ-36. A zeolite of structure type ITW is ITQ-12. Zeolites of structure type JBW are Na-J and nepheline. Zeolites of structure type KFI are ZK-5, P and Q. Zeolites of structure type LEV are levyne, levynite, AlP-35, LZ-132, NU-3, SAPO-35 and ZK-20. A zeolite of structure type -LIT is lithosite. Zeolites of structure type LTA are linde type A, alpha, ITQ-29, LZ-215, N-A, UZM-9, SAPO-42, ZK-21, ZK-22 and ZK-4. Zeolites of structure type LTN are linde type N and NaZ-21. Zeolites of structure type MER are merlinoite, K-M, linde W and zeolite W. Zeolites of structure type MTF are MCM-35 and UTM-1. Zeolites of structure type NSI are Nu-6(2) and EU-20. Zeolites of structure type OWE are UiO-28 and ACP-2. Zeolites of structure type PAU are paulingite and ECR-18. Zeolites of structure type PHI are philippsite, DAF-8, harmotome, wellsite and ZK-19. Zeolites of structure type RHO are rho and LZ-214. Zeolites of structure type RTH are RUB-13, SSZ-36 and SSZ-50. A zeolite of structure type RWR is RUB-24. Zeolites of structure type SAS are STA-6 and SSZ-73. A zeolite of structure type SAT is STA-2. Zeolites of structure type SBN are UCSB-89 and SU-46. A zeolite of structure type SIV is SIZ-7. A zeolite of structure type THO is thomsonite. A zeolite of structure type UEI is Mu-18. A zeolite of structure type UFI is UZM-5. A zeolite of structure type VNI is VPI-9. Zeolites of structure type YUG are yugawaralite and Sr-Q. Zeolites of structure type ZON are ZAPO-M1 and UiO-7.

The use according to the invention preferably comprises a zeolite, the largest channels of which are formed by 8 tetrahedrally coordinated atoms and which belongs to the structure type ABW, AEI, AFX, CHA, ERI, ESV, KFI, LEV or LTA.

The synthesis of zeolites of structure type AEI is described for example in US 2015/118150, that of SSZ-39 in U.S. Pat. No. 5,958,370. Zeolites of structure type AFX are known from WO 2016/077667 A1. Zeolites of structure type CHA are described extensively in the literature; see for example U.S. Pat. No. 4,544,538 for SSZ-13. ZK-5, which belongs to structure type KFI, is described, for example, in EP 288293 A2. Zeolites of structure type LEV are described, for example, in EP 40016 A1, EP 255770A2 and EP 3009400A1. Zeolites belonging to structure type LTA are known, for example, as SAPO-42, ZK-4, ZK-21 and ZK-22. For example, the synthesis of ZK-4 is described by Leiggener et al. in Material Syntheses, Springer Vienna, 2008 (editors, Schubert, Hüsing, Laine), pages 21-28). ZK-21 is described in U.S. Pat. No. 3,355,246 and SAPO-42 is described in US2014/170062.

In another embodiment, the use according to the invention comprises a zeolite, the largest channels of which are formed by 9 tetrahedrally coordinated atoms and which belongs, for example, to structure types -CHI, LOV, NAB, NAT, RSN, STT or VSV.

A zeolite of structure type -CHI is chiavennite. A zeolite of structure type LOV is lovdarite. A zeolite of structure type NAB is nabesite. Zeolites of structure type NAT are natrolite, gonnardite, mesolite, metanatrolite, paranatrolite, tetranatrolite and scolecite. A zeolite of structure type RSN is RUB-17. A zeolite of structure type STT is SSZ-23. Zeolites of structure type VSV are gaultite, VPI-7 and VSV-7.

The use according to the invention preferably comprises a zeolite, the largest channels of which are formed by 9 tetrahedrally coordinated atoms and which belongs to structure type STT. A particularly suitable zeolite of structure type STT is SSZ-23. SSZ-23 is described in U.S. Pat. No. 4,859,442 and can be obtained according to the manufacturing processes specified therein.

In another embodiment, the use according to the invention comprises a zeolite, the largest channels of which are formed by 10 tetrahedrally coordinated atoms and which, for example, belongs to structure types FER, MEL, MFI, MTT, MWW or SZR.

Zeolites belonging to structure type FER are well-known in the literature. For example, ZSM-35 is described in U.S. Pat. No. 4,107,196, NU-23 in EP 103981 A1, FU-9 in EP 55529 A1, ISI-6 in U.S. Pat. No. 4,695,440 and ferrierite, for example, in U.S. Pat. Nos. 3,933,974, 4,000,248 and 4,251,499.

Zeolites belonging to structure type MEL are well-known in the literature. For example, ZSM-11 is described in Nature 275, 119-120, 1978, SSZ-46 is described in U.S. Pat. No. 5,968,474 and TS-2 is described in BE 1001038.

Zeolites belonging to structure type MTT are well-known in the literature. For example, ZSM-23 is described in U.S. Pat. No. 4,076,842, EU-13 is described in U.S. Pat. No. 4,705,674 and ISI-4 is described in U.S. Pat. No. 4,657,750. U.S. Pat. No. 5,314,674 also deals with the synthesis of zeolites of structure type MTT.

Zeolites belonging to structure type MFI are known in the literature under the names ZSM-5, ZS-4, AZ-1, FZ-1, LZ-105, NU-4, NU-5, TS-1, TS, USC-4 and ZBH, for example. For example, ZSM-5 is described in U.S. Pat. Nos. 3,702,886 and 4,139,600.

Zeolites belonging to structure type MWW are known in the literature. For example, SSZ-25 is described in U.S. Pat. No. 4,826,667, MCM-22 is described in Zeolites 15, Issue 1, 2-8, 1995, ITQ-1 is described in U.S. Pat. No. 6,077,498 and PSH-3 is described in U.S. Pat. No. 4,439,409.

Zeolites belonging to structure type SZR are well-known in the literature. For example, SUZ-4 is described in J. Chem. Soc., Chem. Commun., 1993, 894-896.

The use according to the invention preferably comprises a zeolite, the largest channels of which are formed by 10 tetrahedrally coordinated atoms and which belongs to structure type FER.

In another embodiment, the use according to the invention comprises a zeolite, the largest channels of which are formed by 12 tetrahedrally coordinated atoms and which, for example, belongs to structure types AFI, AFR, AFS, AFY, ASV, ATO, ATS, BEA, BEC, BOG, BPH, CAN, CON, CZP, DFO, EMT, EON, EZT, FAU, GME, GON, IFR, ISV, IWR, IWV, IWW, LTL, MAZ, MEI, MOR, MOZ, MSE, MTW, NPO, OFF, OSI, -RON, RWY, SAO, SBE, SBS, SBT, SFE, SFO, SOS, SSY, USI or VET.

Zeolites of structure type AFI are AlPO-5, SSZ-24 and SAPO-5. Zeolites of structure type AFR are SAPO-40 and AlPO-40. A zeolite of structure type AFS is MAPO-46. A zeolite of structure type ASV is ASU-7. Zeolites of structure type ATO are SAPO-31 and AlPO-31. Zeolites of structure type ATS are SSZ-55 and AlPO-36. Zeolites of structure type BEA are beta and CIT-6. Zeolites of structure type BPH are linde Q, STA-5 and UZM-4. Zeolites of structure type CAN are ECR-5, davyn, microsommite, tiptopite and vishnevite. Zeolites of structure type CON are CIT-1, SS-26 and SSZ -33. A zeolite of structure type DFO is DAF-1. Zeolites of structure type EMT are EMC-2, CSZ-1, ECR-30, ZSM-20 and ZSM-3. Zeolites of structure type EON are ECR-1 and TUN-7. A zeolite of structure type EZT is EMM-3. Zeolites of structure type FAU are faujasite, LZ-210, SAPO-37, CSZ -1, ECR-30, ZSM-20 and ZSM-3. A zeolite of structure type GME is gmelinite. A zeolite of structure type GON is GUS-1. Zeolites of structure type IFR are ITQ-4, MCM-58 and SSZ-42. A zeolite of structure type ISV is ITQ-7. A zeolite of structure type IWR is ITQ-24. A zeolite of structure type IWV is ITQ-27. A zeolite of structure type IWW is ITQ-22. Zeolites of structure type LTL are linde type L and LZ-212. Zeolites of structure type MAZ are mazzite, LZ-202, omega and ZSM-4. Zeolites of structure type MEI are ZSM-18 and ECR-40. Zeolites of structure type MOR are mordenite, LZ-211 and Na-D. A zeolite of structure type MOZ is ZSM-10. A zeolite of structure type MSE is MCM-68. Zeolites of structure type MTW are ZSM-12, CZH-5, NU-13, TPZ-12, theta-3 and VS-12. Zeolites of structure type OFF are offretite, LZ-217, linde T and TMA-O. A zeolite of structure type OSI is UiO-6. A zeolite of structure type RWY is UCR-20. A zeolite of structure type SAO is STA-1. A zeolite of structure type SFE is SSZ-48. A zeolite of structure type SFO is SSZ -51. Zeolites of structure type SOS are SU-16 and FJ-17. A zeolite of structure type SSY is SSZ-60. A zeolite of structure type USI is IM-6. A zeolite of structure type VET is VPI-8. The use according to the invention preferably includes a zeolite, the largest channels of which are formed by 12 tetrahedrally coordinated atoms and which belongs to structure type BEA or FAU. Zeolites of structure types BEA and FAU along with their production are described in detail in the literature.

The use according to the invention more particularly preferably comprises a zeolite of structure type ABW, AEI, AFX, BEA, CHA, ERI, ESV, FAU, FER, KFI, LEV, LTA, MFI, SOD or STT.

Furthermore, the use according to the invention comprises more particularly preferably a zeolite belonging to structure type MWW.

The catalyst used according to the invention comprises palladium and platinum. Both are preferably present as cations in the zeolite structure, i.e. in ion-exchanged form. However, they may also be wholly or partly present as metal and/or oxide in the zeolite structure and/or on the surface of the zeolite structure.

Palladium is preferably present in quantities of 0.1 to 5 wt. % and particularly preferably 0.5 to 3 wt. %, based on the sum of the weights of zeolite, platinum and palladium and calculated as palladium metal.

Platinum is preferably present in quantities of 1 to 5 wt. % and particularly preferably of 0.5 to 1.5 wt. %, based on the weight of palladium and calculated as platinum metal.

The catalyst used according to the invention in one embodiment does not contain any other metal, in particular neither copper nor iron, other than palladium and platinum.

In a preferred embodiment, the catalyst used according to the invention comprises zeolites (in particular, ion-exchanged) of structure type ABW, AEI, AFX, BEA, CHA, ERI, ESV, FAU, FER, KFI, LEV, LTA, MFI, SOD or STT coated with 0.5 to 3 wt. % of palladium, based on the sum of the weights of zeolite, platinum and palladium, and calculated as palladium metal, and 0.5 to 5 wt. % of platinum, based on the weight of palladium, and calculated as platinum metal.

The catalyst used according to the invention comprises a supporting body. This can be a flow-through substrate or a wall-flow filter.

A wall-flow filter is a supporting body comprising channels of length L, which extend in parallel between first and second ends of the wall flow filter, which are alternately closed at either the first or second end and are separated by porous walls. A flow-through substrate differs from a wall-flow filter in that the channels of length L are open at both ends.

In an uncoated state, wall-flow filters have porosities of 30 to 80%, in particular 50 to 75%, for example. Their average pore size in an uncoated state is, for example, 5 to 30 micrometers.

As a rule, the pores of the wall-flow filter are so-called open pores; i.e. they have a connection to the channels. In addition, the pores are usually interconnected with one another. This allows, on the one hand, easy coating of the inner pore surfaces and, on the other hand, easy passage of the exhaust gas through the porous walls of the wall-flow filter.

Flow substrates along with wall-flow filters are known to the specialist, and are available on the market. They consist, for example, of silicon carbide, aluminum titanate or cordierite.

Alternatively, carrier substrates made of corrugated sheets of inert materials can also be used. Suitable inert materials are, for example, fibrous materials with an average fiber diameter of 50 to 250 µm and an average fiber length of 2 to 30 mm. Preferably, fibrous materials are heat-resistant and consist of silicon dioxide, in particular glass fibers. For the production of such carrier substrates, for example, sheets of the aforementioned fiber materials are corrugated in the known manner and the individual corrugated sheets are formed into a cylindrical monolithically structured body with channels running through the bodies. Preferably, a monolithically structured body with a crosswise corrugation structure is formed by stacking a number of the corrugated sheets into parallel layers with different orientation of the corrugation between the layers. In one embodiment, uncorrugated, i.e. flat, sheets can be arranged between the corrugated sheets.

Carrier substrates made of corrugated sheets can be coated directly with the catalyst according to the invention; however, preferably they are first coated with an inert material, for example titanium dioxide, and only then with the catalytic material.

Zeolite and the palladium and platinum are present on the carrier substrate in the form of coating A when used according to the invention. The coating may thereby extend over the entire length L of the carrier substrate or only over a section thereof.

In the case of a wall-flow filter, the coating A may be located on the surfaces of the input channels, on the surfaces of the output channels and/or in the porous wall between the input and output channels.

Catalysts used according to the invention, with which the zeolite and the palladium and platinum are present in the form of a coating A on the carrier substrate, can be produced according to methods familiar to the specialist, such as the usual dip-coating processes or pumping- and suction-coating processes with subsequent thermal post-treatment (calcination). The person skilled in the art is aware that, in the case of wall-flow filters, their average pore size and the average particle size of the materials to be coated can be matched to each other in such a manner that they lie on the porous walls that form the channels of the wall flow filter (on-wall coating). The mean particle size of the materials to be coated can also be selected such that they are located in the porous walls that form the channels of the wall flow filter; i.e., that the inner pore surfaces are coated (in-wall coating). In such a case, the mean particle size of the materials to be coated must be small enough to penetrate the pores of the wall-flow filter.

The zeolite and the palladium and platinum are coated over the entire length L of the carrier substrate in one embodiment of the present invention, wherein no additional catalytically active coating is present on the carrier substrate.

However, in another embodiment of the present invention, the carrier substrate may also carry one or more other catalytically active coatings.

For example, in addition to a coating comprising the zeolite and the palladium and platinum, the carrier substrate may include an additional coating B, which is active in terms of catalytic oxidation. The coating B that is active in terms of catalytic oxidation comprises, for example, platinum, palladium, or platinum and palladium on a carrier material. In the latter case, for example, the mass ratio of platinum to palladium is 2:1 to 14:1.

All materials that are familiar to the person skilled in the art for this purpose are considered as carrier materials. They have a BET surface area of 30 to 250 m²/g, preferably 100 to 200 m²/g (determined according to DIN 66132) and are in particular aluminum oxide, silicon oxide, magnesium oxide, titanium oxide, zirconium oxide and mixtures or mixed oxides of at least two of these materials.

Aluminum oxide, magnesium/aluminum mixed oxides, and aluminum/silicon mixed oxides are preferred. If aluminum oxide is used, it is particularly preferably stabilized, for example, with 1 to 6 wt. %, in particular 4 wt. %, lanthanum oxide.

It is preferred that the coating A contains only a single zeolite. Furthermore, it is preferred that the coating B is free of zeolites containing platinum and/or palladium. In particular, the coating A contains only a single zeolite and the coating B is free of zeolites containing platinum and/or palladium.

The coating (coating A) comprising the zeolite and the palladium and platinum and the coating that is active in terms of catalytic oxidation (coating B) can be arranged on the substrate in different ways.

If the carrier substrate is a flow-through substrate, both coatings may, for example, be present coated over the entire length L or only over a section of the carrier substrate.

For example, the coating A can extend from one end of the support body to 10 to 80% of its length L and the coating B can extend from the other end of the support body to 10 to 80% of its length $L_A$. In such a case, it may be that $L=L_A+L_B$ applies, wherein LA is the length of the coating A and $L_B$ is the length of the coating B. However, $L<L_A+L_B$ may also apply. In this case, coatings A and B overlap. Finally, $L>L_A+L_B$ may also apply if a section of the supporting body remains free of coatings. In the latter case, there is a gap of at least 0.5 cm between the coatings A and B, for example 0.5 to 1 cm.

However, coatings A and B may both also be coated over the entire length L. In this case, coating B, for example, may be present directly on the carrier substrate, and coating A on coating B. Alternatively, the coating A can be applied directly to the substrate and the coating B can be applied to the coating A.

It is also possible that one coating may extend over the entire length of the support body and the other coating may extend over only part of it.

In a preferred embodiment, a zeolite (in particular, ion-exchanged) of structure type ABW, AEI, AFX, BEA, CHA, ERI, ESV, FAU, FER, KFI, LEV, LTA, MFI, SOD or STT coated with 0.5 to 3 wt. % of palladium, based on the sum of the weights of zeolite, platinum and palladium, and calculated as palladium metal, and 0.5 to 5 wt. % of platinum, based on the weight of the palladium, and calculated as platinum metal, lies directly on the carrier substrate over the entire length L thereof and on this coating there is a coating containing platinum or platinum and palladium in a mass ratio of 2:1 to 14:1, likewise over the entire length L.

In particular, the lower layer is present in a quantity of 50 to 250 g/l of carrier substrate and the upper layer is present in a quantity of 50 to 100 g/l of carrier substrate.

If the carrier substrate is a wall-flow filter, the coatings A and B may extend over the entire length L of the wall-flow filter or only part of it, as described above for flow-through substrates.

In addition, the coatings may lie on the walls of the input channels, on the walls of the output channels or in the walls between the input and output channels.

In another embodiment of the present invention, the carrier substrate is formed from zeolite, palladium and platinum, along with a matrix component.

Carrier substrates, flow-through substrates and wall-flow substrates that do not just consist of inert material, such as cordierite, but additionally contain a catalytically active material are known to the person skilled in the art. To produce them, a mixture consisting of, for example, 10 to 95% by weight of an inert matrix component and 5 to 90% by weight of catalytically active material is extruded according to a method known per se. All of the inert materials that are also otherwise used to produce catalyst substrates can be used as matrix components in this case. These are, for example, silicates, oxides, nitrides, or carbides, wherein in particular magnesium aluminum silicates are preferred.

In embodiments of the present invention, the extruded carrier substrate comprising the zeolite, palladium and platinum may be coated with one or more catalytically active coatings, such as the coating that is active in terms of catalytic oxidation described above.

The catalyst is excellently suited for use as a passive nitrogen oxide storage catalyst; i.e., it can take into storage nitrogen oxides at temperatures below 200° C. and release them from storage again at temperatures above 200° C. It is, therefore, possible, in combination with a downstream SCR catalyst, to effectively convert nitrogen oxides across the entire temperature range of the exhaust gas, including the cold-start temperatures.

Accordingly, in one embodiment of the use according to the invention, the catalyst is a component of an exhaust system comprising an SCR catalyst.

In principle, the SCR catalyst can be selected from all catalysts active in the SCR reaction of nitrogen oxides with ammonia, in particular those known to the person skilled in the art in the field of automotive exhaust catalysis to be commonly used. This includes catalysts of the mixed oxide type along with catalysts based on zeolites, in particular transition-metal-exchanged zeolites, for example zeolites exchanged with copper, iron or copper and iron.

In embodiments of the present invention, SCR catalysts that are a small-pored zeolite with a maximum ring size of eight tetrahedral atoms and a transition metal, for example copper, iron or copper and iron, are used, Such SCR catalysts are described for example in WO2008/106519 A1, WO2008/118434 A1 and WO2008/132452 A2.

In addition, large-pored and medium-pored zeolites can also be used, with those of the BEA structure type in particular coming into question. Thus, iron-BEA and copper-BEA are of interest.

Particularly preferred zeolites belong to the scaffold types BEA, AEI, CHA, KFI, ERI, LEV, MER or DDR and are particularly preferably exchanged with copper, iron or copper and iron.

The term zeolites within the context of the present invention also includes molecular sieves, which are sometimes also referred to as "zeolite-like" compounds. Molecular sieves are preferred, if they belong to one of the aforementioned structure types. Examples include silica aluminum phosphate zeolites, which are known by the term SAPO, and aluminum phosphate zeolites, which are known by the term AlPO.

These are also preferred in particular if they are exchanged with copper, iron or copper and iron.

Preferred zeolites continue to be those that have a SAR (silica-to-alumina ratio) value of 2 to 100, in particular of 5 to 50.

The zeolites or molecular sieves contain transition metal—in particular, in quantities of 1 to 10 wt %, and especially 2 to 5 wt %—calculated as metal oxide, i.e., for example, as $Fe_2O_3$ or CuO.

Preferred embodiments of the present invention contain zeolites or molecular sieves of the beta type (BEA), chabazite type (CHA) or levyne type (LEV) exchanged as SCR catalysts with copper, iron or copper and iron. Corresponding zeolites or molecular sieves are known under the designations ZSM-5, beta, SSZ-13, SSZ-62, Nu-3, ZK-20, LZ-132, SAPO-34, SAPO-35, AlPO-34 and AlPO-35; see, for instance, U.S. Pat. Nos. 6,709,644 and 8,617,474.

In one embodiment of the use according to the invention, which includes an SCR catalyst, an injection device for a reducing agent is located between the catalyst comprising a carrier substrate of length L, a zeolite, palladium and platinum and the SCR catalyst.

The injection device can be chosen at will by the person skilled in the art, wherein suitable devices can be taken from the literature (see, for example, T. Mayer, Solids SCR system based on ammonium carbamate, dissertation, Technical University of Kaiserslautem, 2005). The ammonia can be injected into the exhaust gas stream via the injection device either as such or in the form of a compound from which ammonia is formed under ambient conditions. These include aqueous solutions of urea or ammonium formate, for example, along with solid ammonium carbamate. As a rule, the reducing agent or a precursor thereof is kept in stock in a container that is carried along with and connected to the injection device.

The SCR catalyst is preferably in the form of a coating on a supporting body, which can be a flow-through substrate or a wall-flow filter and can consist of silicon carbide, aluminum titanate or cordierite, for example.

Alternatively, the supporting body itself can consist of the SCR catalyst and a matrix component as described above; i.e., in extruded form.

EXAMPLE 1 a) A zeolite of type SSZ-13 (structure type CHA, SAR=14) is impregnated with 2 wt. % of palladium (from commercially available palladium nitrate) ("incipient wetness"). The powder thus obtained is then dried in stages at 120 and 350° C. and calcined at 500° C.

b) The resulting calcined powder containing Pd is suspended in demineralized water, mixed with 8% of a commercially available binder based on boehmite and ground in a ball mill. Subsequently, according to a conventional method, a commercially available honeycomb ceramic substrate (flow-through substrate) is coated along its entire length with the washcoat thus obtained. The washcoat load is 150 g/L, based on the Pd-containing zeolites (corresponding to 162 g/L incl. binder), which corresponds to a palladium load of 85 g/ft$^3$ Pd.

c) The catalyst obtained according to step b) is impregnated with a Pt nitrate solution, such that the amount of platinum applied corresponds to 1 wt. % of the amount of palladium applied in step b). The platinum load is thus 0.85 g/ft$^3$ Pt. Finally, calcination takes place at 550° C.

EXAMPLE 2

Example 1 is repeated with the difference that, in step c), the amount of platinum applied is 0.1 wt. % of the amount of palladium applied in step b). The platinum load is thus 0.085 g/ft$^3$.

COMPARATIVE EXAMPLE 1

Example 1 is repeated with the difference that step c) has been omitted.

EXAMPLE 3

Example 1 is repeated with the difference that a zeolite of structure type BEA (SAR=10) is used.

COMPARATIVE EXAMPLE 2

Example 3 is repeated with the difference that step c) has been omitted.

EXAMPLE 4

Example 1 is repeated with the difference that a zeolite of structure type AEI is used.

EXAMPLE 5

In a further step, the catalyst obtained in Example 1 is likewise coated over its entire length with a washcoat containing platinum supported on aluminum oxide, using a conventional process. The washcoat load of the second layer is 75 g/L, the platinum load is 20 g/ft$^3$.

EXAMPLE 6

The catalyst according to Example 5 is combined with a second coated flow-through substrate to form an exhaust system. The second flow substrate is thereby exchanged with a zeolite of the chabazite structure type exchanged with 3 wt. % of copper (calculated as CuO). The washcoat load of the second flow-through substrate is 150 g/L.

Comparative Experiments

The catalysts according to Examples 1, 2 and Comparative Example 1, along with Example 3 and Comparative Example 2, are subjected to an NOx storage test with subsequent temperature-programmed desorption (TPD).

This occurs in a suitable model gas reactor using a so-called "drill core" with the dimensions 1"×3" (diameter× length) and a cell size of 400 cpsi along with a wall thickness of 4.3 mil.

Two different gas compositions are used in the course of the test:
a) Lean phase without NO; and
b) Storage phase with NO.

Lean phase a) is characterized in that, at a space velocity of 50,000 1/h, the gases of oxygen are present in 8% by volume, carbon dioxide in 10% by volume, and water in 10% by volume. Storage phase b) differs from lean phase a) in that, at a space velocity of 30,000 1/h, 500 ppm of nitrogen oxide is present in addition to the first three gases. At the beginning of the measurement, the core is baked for a period of 15 minutes at a temperature of 550° C. under gas condition a), in order to start with an empty level of the catalyst, then cooled to a temperature of 100° C. At that point, gas condition b) is switched to for a duration of 40 minutes at a temperature of 100° C. At the end of this 40 min, gas condition a) is set again and the temperature is simultaneously increased at a rate of 60 K/min (temperature-programmed desorption) until a final temperature of 550° C. has been reached. This final temperature is maintained for a further 15 minutes.

Figure 2:
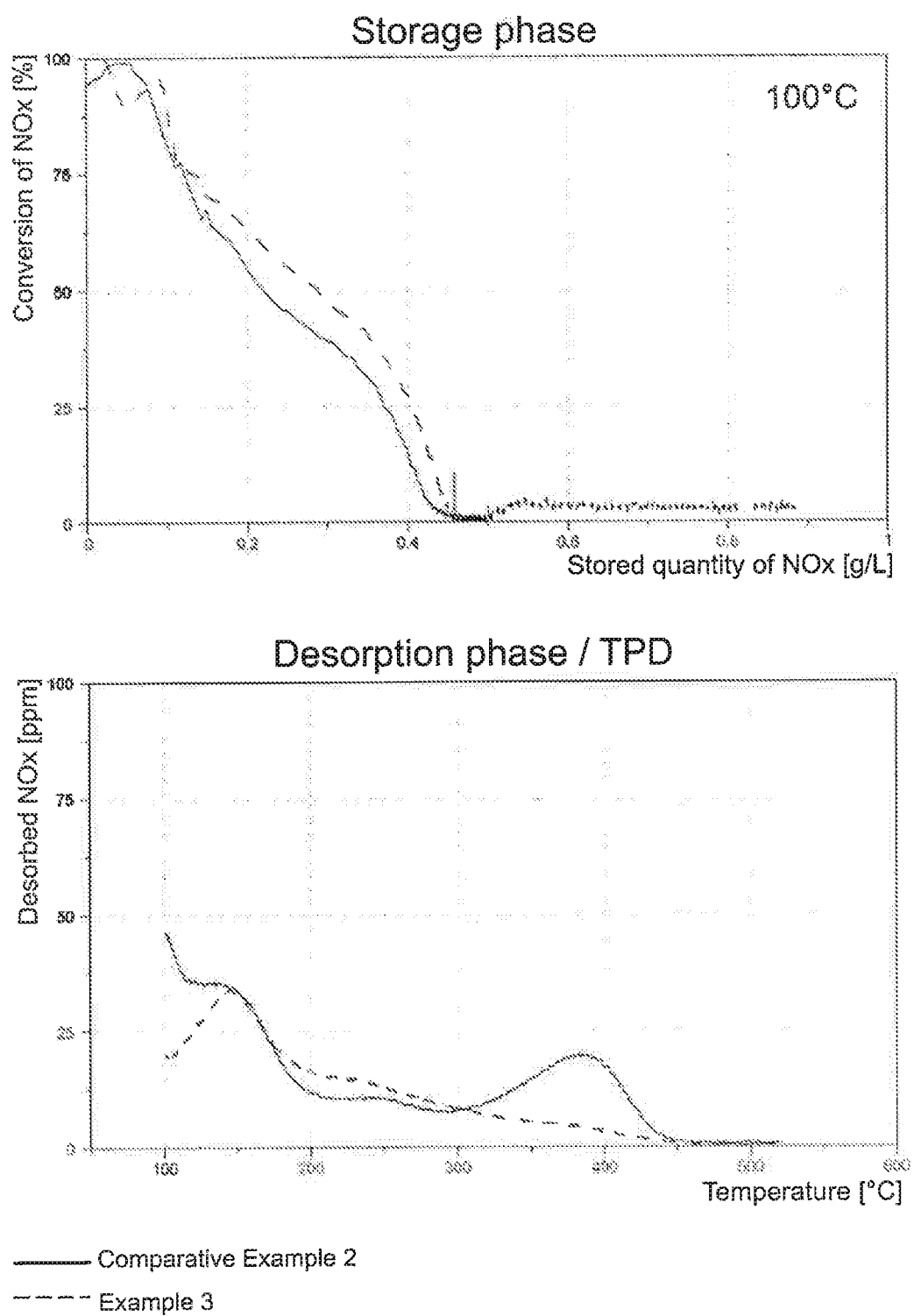
FIG. 2 shows NOx storage and desorption phase comparisons for Example 3 and Comparative Example 2.

The results are shown in FIGS. 1 to 2.

According to FIG. 1, the catalysts in Examples 1, 2 and Comparative Example 1 store nitrogen oxide almost identically at 100° C. (storage phase). The desorption phase shows that the catalyst of Comparative Example 1 desorbs a part of the nitrogen oxide at approximately 200° C. and a further considerable part only between 400 and 500° C. Since this temperature range is hardly reached in modern exhaust systems, this means that the catalyst in Comparative Example 1 no longer completely desorbs the stored nitrogen oxide and thus has less storage capacity available in a new cycle.

In contrast, the catalysts in Examples 1 and 2 desorb the stored nitrogen oxide at lower temperatures. More storage capacity is thus available in a subsequent cycle.

FIG. 2 shows an analogous image. The catalysts in Example 3 and Comparative Example 2 store nitrogen oxide almost identically at 100° C. (storage phase). In contrast, in the desorption phase, the catalyst in Example 3 desorbs most of the nitrogen oxide at a temperature of approximately 150° C., while the catalyst of Comparative Example 2 desorbs a considerable proportion of the stored nitrogen oxide only at approximately 400° C. In a subsequent cycle, in the case of the catalyst of Comparative Example 2, less storage capacity is available.

The invention claimed is:

1. A catalyst comprising a carrier substrate of length L and a coating A comprising a zeolite, palladium and platinum, wherein palladium is present in amounts of 0.01 to 10 wt. %, based on the sum of the weights of zeolite, platinum and palladium, and is calculated as palladium metal, and platinum is present in amounts of 0.1 to 10 wt. %, based on the weight of palladium, and is calculated as platinum metal, as a passive nitrogen oxide adsorber that stores nitrogen oxides in a first temperature range and releases them again in a second temperature range, wherein the second temperature range is at higher temperatures than the first temperature range, and wherein the largest channels of the zeolite are formed by 6 tetrahedrally coordinated atoms and the zeolite belongs to structure types AFG, AST, DOH, FAR, FRA, GIU, LIO, LOS, MAR, MEP, MSO, MTN, NON, RUT, SGT, SOD, SVV, TOL or UOZ.

2. The catalyst according to claim 1, wherein the zeolite is SOD.

3. The catalyst according to claim 1, wherein the palladium and the platinum are present as a cation in the zeolite structure.

4. The catalyst according to claim 1, wherein the zeolite has 0.5 to 3 wt. % of palladium, based on the sum of the weights of zeolite, platinum and palladium, and calculated as palladium metal, and 0.5 to 5 wt. % of platinum, based on the weight of palladium, and calculated as platinum metal.

5. The catalyst according to claim 1, wherein the carrier substrate carries another catalytically active coating B, which is a coating that is active in terms of catalytic oxidation and comprises platinum, palladium or platinum and palladium on a carrier material.

6. The catalyst according to claim 1, wherein the zeolite is coated with 0.5 to 3 wt. % of palladium, based on the sum of the weights of zeolite, platinum and palladium, and calculated as palladium metal, and 0.5 to 5 wt. % of platinum, based on the weight of the palladium, and calculated as platinum metal, extends directly on the carrier substrate over its entire length L, and on this coating there is a coating containing platinum or platinum and palladium in a mass ratio of 2:1 to 14:1 over the entire length L.

7. A catalyst comprising a carrier substrate of length L and a coating A comprising a zeolite, palladium and platinum, wherein palladium is present in amounts of 0.01 to 10 wt. %, based on the sum of the weights of zeolite, platinum and palladium, and is calculated as palladium metal, and platinum is present in amounts of 0.1 to 10 wt. %, based on the weight of palladium, and is calculated as platinum metal, as a passive nitrogen oxide adsorber that stores nitrogen oxides in a first temperature range and releases them again in a second temperature range, wherein the second temperature range is at higher temperatures than the first temperature range, and wherein the largest channels of the zeolite are formed by 9 tetrahedrally coordinated atoms and the zeolite belongs to structure types -CHI, LOV, NAB, NAT, RSN, STT or VSV.

8. The catalyst according to claim 7, wherein the carrier substrate carries another catalytically active coating B, which is a coating that is active in terms of catalytic oxidation and comprises platinum, palladium or platinum and palladium on a carrier material.

9. The catalyst according to claim 7, wherein the zeolite is STT.

10. A catalyst comprising a carrier substrate of length L and a coating A comprising a zeolite, palladium and platinum, wherein palladium is present in amounts of 0.01 to 10 wt. %, based on the sum of the weights of zeolite, platinum and palladium, and is calculated as palladium metal, and platinum is present in amounts of 0.1 to 10 wt. %, based on the weight of palladium, and is calculated as platinum metal, as a passive nitrogen oxide adsorber that stores nitrogen oxides in a first temperature range and releases them again in a second temperature range, wherein the second temperature range is at higher temperatures than the first temperature range, and wherein the largest channels of the zeolite are formed by 10 tetrahedrally coordinated atoms and the zeolite belongs to structure types FER, MEL, MFI, MTT, MWW or SZR, and wherein the coating A is free of a combination of LTL type zeolite with either platinum, palladium or platinum and palladium.

11. The catalyst according to claim 10, wherein the zeolite is FER or MFI.

12. The catalyst according to claim 10, wherein the coating A is free of any zeolite of the LTL type.

13. The catalyst according to claim 10, wherein the carrier substrate does not include or does not support any zeolite of the LTL type.

14. The catalyst according to claim 10, wherein the carrier substrate carries another catalytically active coating B, which is a coating that is active in terms of catalytic oxidation and comprises platinum, palladium, or platinum and palladium on a carrier material, and is free of a zeolite containing any of platinum, palladium, or platinum and palladium.

15. An exhaust gas system comprising an exhaust passageway and a first catalyst according to claim 1 receiving exhaust from the exhaust gas passageway and further comprising an SCR catalyst positioned downstream of the first catalyst as to also receive exhaust from the exhaust gas passageway.

16. The system according to claim 15, wherein the SCR catalyst is a zeolite belonging to the scaffold type BEA, AEI, CHA, KFI, ERI, LEV, MER or DDR and is exchanged with copper, iron or copper and iron.

17. A method of passively supplying nitrogen oxide to a downstream positioned SCR catalyst, comprising: supplying exhaust to the passive nitrogen oxide adsorber according to claim 1 such that passive nitrogen oxide adsorber stores nitrogen oxides in the first temperature range and releases them again in the second temperature range such that the released nitrogen oxides travel to the downstream SCR positioned catalyst.

18. A method of storing nitrogen oxide comprising providing the catalyst according to claim 1 within an exhaust flow containing nitrogen oxide.

19. An exhaust gas system comprising an exhaust passageway and a first catalyst according to claim 7 receiving exhaust from the exhaust gas passageway and a second catalyst which is an SCR catalyst that is positioned downstream of the first catalyst as to also receive exhaust from the exhaust gas passageway.

20. A method of storing nitrogen oxide comprising providing the catalyst according to claim 7 within an exhaust flow containing nitrogen oxide.

21. A method of passively supplying nitrogen oxide to a downstream positioned SCR catalyst comprising supplying exhaust to the passive nitrogen oxide adsorber according to claim 7 such that passive nitrogen oxide adsorber stores nitrogen oxides in the first temperature range and releases them again in the second temperature range such that the released nitrogen oxides travel to the downstream SCR positioned catalyst.

22. An exhaust gas system comprising an exhaust passageway and a first catalyst according to claim 10 receiving exhaust from the exhaust gas passageway and a second catalyst which is an SCR catalyst that is positioned downstream of the first catalyst as to also receive exhaust from the exhaust gas passageway.

23. A method of passively supplying nitrogen oxide to a downstream positioned SCR catalyst comprising supplying exhaust to the passive nitrogen oxide adsorber according to claim 10 such that passive nitrogen oxide adsorber stores nitrogen oxides in the first temperature range and releases them again in the second temperature range such that the released nitrogen oxides travel to the downstream SCR positioned catalyst.

* * * * *